[125.]
ANDREW DAVIS.
Machines for Leveling Cutting-Blocks.
No. 118,912. Patented Sep. 12, 1871.
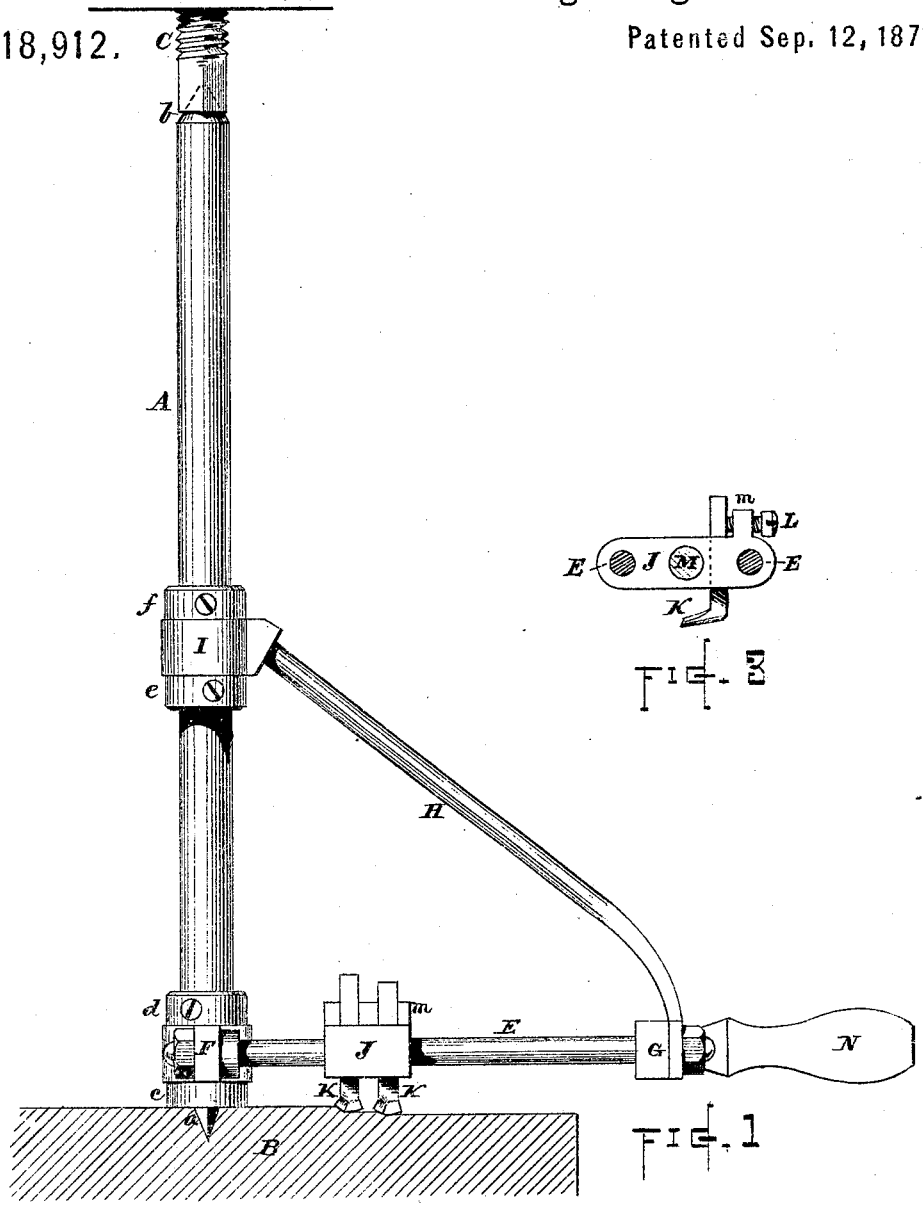
Fig. 3
Fig. 1
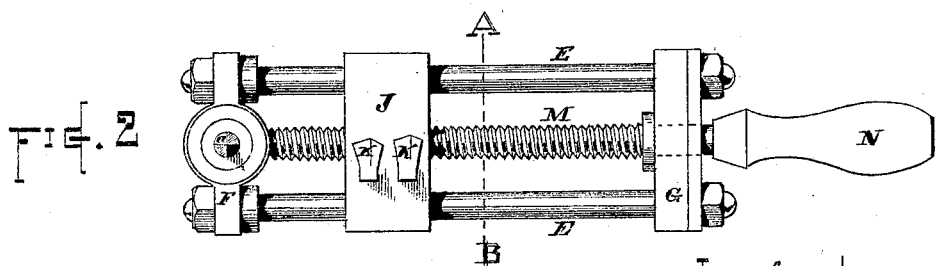
Fig. 2
Witnesses  Inventor
Thos. H. Dodge  Andrew Davis

118,912

UNITED STATES PATENT OFFICE.

ANDREW DAVIS, OF OXFORD, MASSACHUSETTS.

IMPROVEMENT IN MACHINES FOR LEVELING CUTTING-BLOCKS.

Specification forming part of Letters Patent No. 118,912, dated September 12, 1871.

*To all whom it may concern:*

Be it known that I, ANDREW DAVIS, of Oxford, in the county of Worcester and Commonwealth of Massachusetts, have invented certain new and useful Improvements in Machine for Leveling off Cutting-Blocks used for sole-leather cutting and other purposes; and I do hereby declare the following to be a full, clear, and exact description of the same, reference being had to the accompanying drawing which forms a part of this specification, and in which—

Figure 1 represents a side view of my improved leveling machine. Fig. 2 represents a bottom view of the same, and Fig. 3 represents a transverse section of the arm or lever at line A B, Fig. 2.

To enable others skilled in the art to which my invention belongs to make and use the same, I will proceed to describe it more in detail.

The nature of my invention consists in certain improved mechanism, as herein described, for facilitating the operation of leveling off cutting-blocks used for sole-leather cutting and for other purposes, after they have become worn upon their surfaces and thereby unfit for use.

In the drawing, the part marked A represents an upright spindle or standard, which is furnished with a center-point, $a$, at its lower end, for retaining it in position upon the block B, and with a conical top, $b$, which fits into a hollow-headed supporting-screw, C, arranged in a suitable top frame, D, by means of which the spindle A is retained in an upright position. At the lower end of the upright spindle or standard A is arranged a horizontal arm, formed of two parallel bars, E E, extending between two cross-heads, F and G, one of which, F, is bored out and fitted around the spindle A to form a bearing thereon, while from the other, G, a brace, H, extends diagonally upward and is secured at its upper end to a bearing, I, which is arranged around the spindle A at some distance above the bearing F, as shown. The bearings F and I are retained in proper position upon the spindle A by means of collars $c$ $d$ $e$ $f$ secured to the spindle by set-screws, or in any other convenient manner. The lower end of the spindle A is turned off square, so that it will rest firmly upon the block B, and the center point $a$ which projects therefrom is made square or in the form of an inverted pyramid, so that when set into the wood of the block B it will hold the spindle A and prevent it from turning while the arm E E is being swung around said spindle. J indicates the carriage which supports the cutting-tools K K, the shanks of which pass up through rectangular openings and are secured by set-screws L arranged in an upward-projecting portion, $m$, of the carriage J, as shown in the drawing. A feeding-screw, M, is arranged through the central part of the carriage J, which screw M extends parallel with and centrally between the bars E E, and has its support in the bearing or head F and the cross-head G, as illustrated in Fig. 2. The spindle of the screw M passes through the cross-head G, and is furnished on its outer end with a handle, N, that serves as a means of revolving the feed-screw to move the carriage, and also to swing the arm E E around the center spindle or standard A. The top frame D may be made of any desired or convenient form, or the screw C may be set into one of the ceiling-joists of the shop when convenient. In lieu of using the supporting-screw C the spindle A may be provided with a screw-thread cut upon its upper end, and a nut fitted thereon having three arms, which extend upward and rest against the ceiling, in the manner of an inverted tripod, for supporting the spindle in a vertical position, thus enabling the machine to be used in rooms of any height by simply running the nut up or down the spindle.

The operation of my improved leveling device is as follows: The block B to be leveled off is placed in a horizontal position, the center point of the spindle A set into the surface of the block, and the screw C run down upon the upper end of the spindle A to hold the latter in a vertical position. The cutters K K are then adjusted to the proper height to cut off the requisite amount of wood, and firmly secured by the set-screws L. The operator then takes hold of the handle N and swings the arm E E around the center spindle, thereby causing the cutters K to plane off a shaving around the block. He also turns the screw M, which feeds forward the carriage J and cutters K as fast as the wood is removed, until the whole surface of the block is leveled except the small spot upon which the lower end of the spindle A rests, which can be taken off with a chisel after the machine is removed; or, by changing the spindle to another position upon the block it can be removed by using the cutters in the manner before stated.

From the foregoing description it will be observed that cutting-blocks such as are used for cutting leather upon and for other similar purposes can be leveled off, after they have become much worn, in a very perfect and expeditious manner, and with the expenditure of much less labor than is required by the ordinary practice of hewing them down with an adze.

Having described my improved machine for leveling off cutting-blocks used for sole-leather cutting and for other purposes, what I claim therein as new and of my invention, and desire to secure by Letters Patent, is—

1. The combination, with the spindle A, of a cutter-supporting arm, provided with bearings F I, carriage J, cutter or cutters K, and feed-screw M, substantially as and for the purposes herein set forth.

2. A machine for leveling cutting-blocks used in cutting leather and for other purposes, consisting of the center spindle A, arm E E, bearings F I G, collars $c \; d \; e \; f$, brace H, carriage J, cutters K, feed-screw M, and handle N, said parts being constructed and combined for operation substantially as shown and described.

ANDREW DAVIS.

Witnesses:
 THOS. H. DODGE,
 CHAS. H. BURLEIGH.